United States Patent
Linzer et al.

(10) Patent No.: US 8,312,499 B2
(45) Date of Patent: Nov. 13, 2012

(54) TUNNELING INFORMATION IN COMPRESSED AUDIO AND/OR VIDEO BIT STREAMS

(75) Inventors: Elliot N. Linzer, Suffern, NY (US); Aaron G. Wells, Oakland, CA (US)

(73) Assignee: LSI Corporation, Milpitas, CA (US)

( * ) Notice: Subject to any disclaimer, the term of this patent is extended or adjusted under 35 U.S.C. 154(b) by 2698 days.

(21) Appl. No.: 10/939,786

(22) Filed: Sep. 13, 2004

(65) Prior Publication Data

US 2006/0056627 A1 Mar. 16, 2006

(51) Int. Cl.
*H04N 7/173* (2006.01)
(52) U.S. Cl. .................. 725/116; 380/217; 375/240.01; 375/240.12; 375/240.29
(58) Field of Classification Search .................... 725/25, 725/30, 31; 380/217; 348/398.1, 446, 441, 348/586; 375/240.01–240.29
See application file for complete search history.

(56) References Cited

U.S. PATENT DOCUMENTS

| | | | | |
|---|---|---|---|---|
| 2001/0012322 A1* | 8/2001 | Nagaoka et al. | ............. | 375/240 |
| 2003/0137601 A1* | 7/2003 | Chen et al. | .................... | 348/446 |
| 2003/0142098 A1* | 7/2003 | Kim et al. | .................... | 345/475 |
| 2005/0275752 A1* | 12/2005 | Li et al. | ...................... | 348/398.1 |

* cited by examiner

*Primary Examiner* — Scott Beliveau
*Assistant Examiner* — Alan Luong
(74) *Attorney, Agent, or Firm* — Christopher P. Maiorana, PC

(57) ABSTRACT

A method for conveying private or enhancement information in a compressed bit stream comprising the steps of (A) generating a compressed bit stream in response to a first data stream and a plurality of encoding choices and (B) controlling the encoding choices in response to a second data stream comprising one or both of the private information and the enhancement information.

22 Claims, 5 Drawing Sheets

TUNNELING INFORMATION IN COMPRESSED AUDIO AND/OR VIDEO BIT STREAMS

FIELD OF THE INVENTION

The present invention relates to compressed bit streams generally and, more particularly, to tunneling information in a compressed audio or video bit stream.

BACKGROUND OF THE INVENTION

There are many instances where compressed audio-video (A/V) information is transmitted or stored and must be played back by a "legacy" decoder (i.e., a decoder using an earlier standard). Such systems often allow for the transmission or storage of related non-A/V data such as closed captioning information.

It would be desirable to have additional capability for the transmission and/or storage of related non-A/V data (e.g., private and/or enhancement information) with compressed audio and/or video bit streams that (a) can be processed by decoding devices that are aware of the possible presence of the data and (b) will not affect legacy decoders that cannot process the data.

SUMMARY OF THE INVENTION

In one embodiment, the present invention concerns a method for conveying private or enhancement information in a compressed bit stream comprising the steps of (A) generating a compressed bit stream in response to a first data stream and a plurality of encoding choices and (B) controlling the encoding choices in response to a second data stream comprising one or both of the private information and the enhancement information.

The objects, features and advantages of the present invention include providing a method and/or apparatus for tunneling information in compressed audio and/or video bit streams that may (i) provide for transmission and/or storage of related non-A/V data with compressed audio and/or video bit streams such that the non-A/V data may be processed by decoding devices that are aware of the possible presence of the data, (ii) not affect legacy decoders that cannot process the non-A/V data, (iii) provide a solution that is 100% backward compatible, (iv) detect tunneling information signature in the elementary stream encoding decisions, (v) make use of tunneled information to provide an improved viewing experience, (vi) communicate information that cannot be re-generated by a decoder, (vii) convey private and/or enhancement information within (in-band) a compressed audio and/or video bit stream, (viii) send information using existing syntax of the compressed A/V stream, and/or (ix) be used for 3:2 pulldown communications to a decoder.

BRIEF DESCRIPTION OF THE DRAWINGS

These and other objects, features and advantages of the present invention will be apparent from the following detailed description and the appended claims and drawings in which:

DETAILED DESCRIPTION OF THE PREFERRED EMBODIMENTS

Compression standards (e.g., MPEG-1, MPEG-2, MPEG-4, VC-9, H.264, etc.) generally specify a bit stream format of a compressed bit stream. The methods by which decoders decode audio and/or video data (e.g., convert the compressed bit stream to decoded samples) is generally also specified by the compression standards supported. Compression standards generally do not describe normative methods for converting uncompressed samples to compressed streams. However, many such standards often provide example software for compression.

The present invention generally provides a method for transmitting information from an enhanced audio/video (A/V) encoder to an enhanced A/V decoder. The information is generally transmitted in a way that (i) conventional (or legacy) decoders will operate correctly (e.g., as if the information were not sent) and (ii) the enhanced decoder may receive and use the new information. For example, the information may be sent using the existing syntax of the compressed A/V stream by making encoding "choices" that may be detected by an enhanced decoder.

Figure 1:
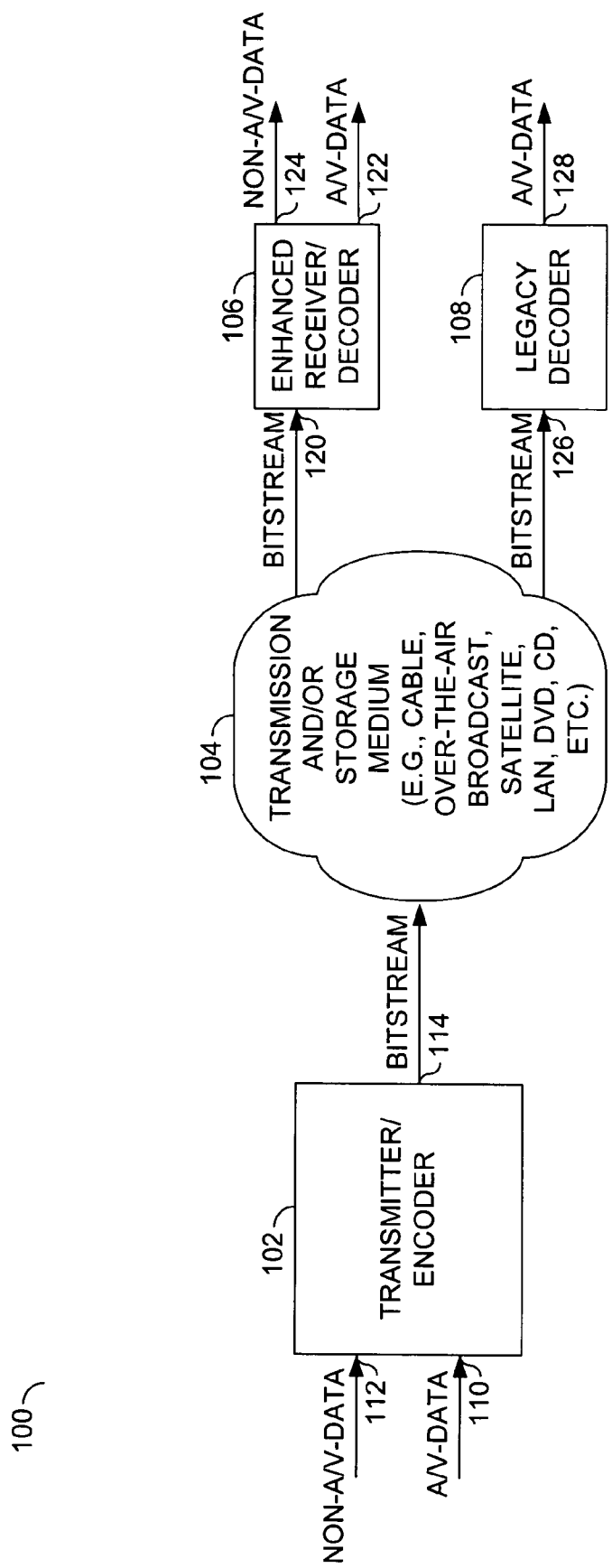
FIG. 1 is a block diagram illustrating an audio-video (A/V) system in accordance with a preferred embodiment of the present invention.

Referring to FIG. 1, a block diagram of a system 100 is shown. The system 100 may comprise a block (or circuit) 102, a block (or circuit) 104, a block (or circuit) 106 and/or a block (or circuit) 108. The block 102 may be implemented in one example, as a transmitter and/or encoder block. The block 104 may be implemented as a transmission and/or storage medium (e.g., cable, over-the-air broadcasts, satellite, LAN, DVD, CD, etc.) The block 106 may be implemented, in one example, as a receiver and/or decoder in accordance with the present invention. The block 108 may be implemented, in one example, as a legacy decoder.

The block 102 may have an input 110 that may receive a signal (e.g., A/V_DATA), an input 112 that may receive a signal (e.g., NON_A/V_DATA) and an output 114 that may present a signal (e.g., BITSTREAM). The signal A/V_DATA may comprise audio and/or video information. The signal NON_A/V_DATA may comprise, for example, non-audio-video information (e.g., judder information, repeated frames information, spatial analysis information, temporal analysis information, commercial detection information, de-interlacing control information, filtering information, private information and/or image enhancement information). The signal NON_A/V_DATA may comprise information (i) received by the block 102 and/or (ii) generated internally by the block 102. The signal BITSTREAM may comprise a compressed and/or encoded bit stream. The signal BITSTREAM is generally configured to communicate the audio-video information from the signal A/V_DATA and the non-audio-video information from the signal NON_A/V_DATA to the transmission and/or storage medium 104.

The circuit 106 may be configured to recover the signal A/V_DATA and the signal NON_A/V_DATA from the signal BITSTREAM. The circuit 106 may have an input 120 that may receive the signal BITSTREAM, an output 122 that may present the signal A/V_DATA and an output 124 that may present the signal NON_A/V_DATA.

The circuit 108 may be implemented as a legacy decoder. The circuit 108 may have an input 126 that may receive the signal BITSTREAM and an output 128 that may present the signal A/V_DATA. The circuit 108 is generally configured to generate the signal A/V_DATA in response to the signal BITSTREAM. In general, the circuit 108 is unaware of the non-audio-video data embedded in the signal BITSTREAM by the encoder 102.

The encoder 102 generally has the ability to make many "decisions" about how to encode an audio or a video stream. If the decisions are made wisely, the decoded quality is generally good. If the decisions are made poorly, the decoded quality may be poor. The present invention generally provides methods to make encoder "decisions" that may be used to convey information to an "aware" (e.g., implemented in accordance with the present invention) decoder. Specifically, the aware decoder may be configured to examine the decisions made by the encoder and determine whether the bit stream is from an encoder configured to tunnel additional data in the bit stream (e.g., implemented in accordance with the present invention) and, if so, what the data is.

In general, the first step may not be fool-proof. For example, there may be cases where a conventional encoder happens to make decisions that appear to be from a novel encoder. However, signaling that data is present by choosing decisions that conventional encoders simply do not make and/or having the decoder look for consistent patterns that are highly unlikely to be produced by conventional encoders may minimize a risk of false information.

Figure 2:
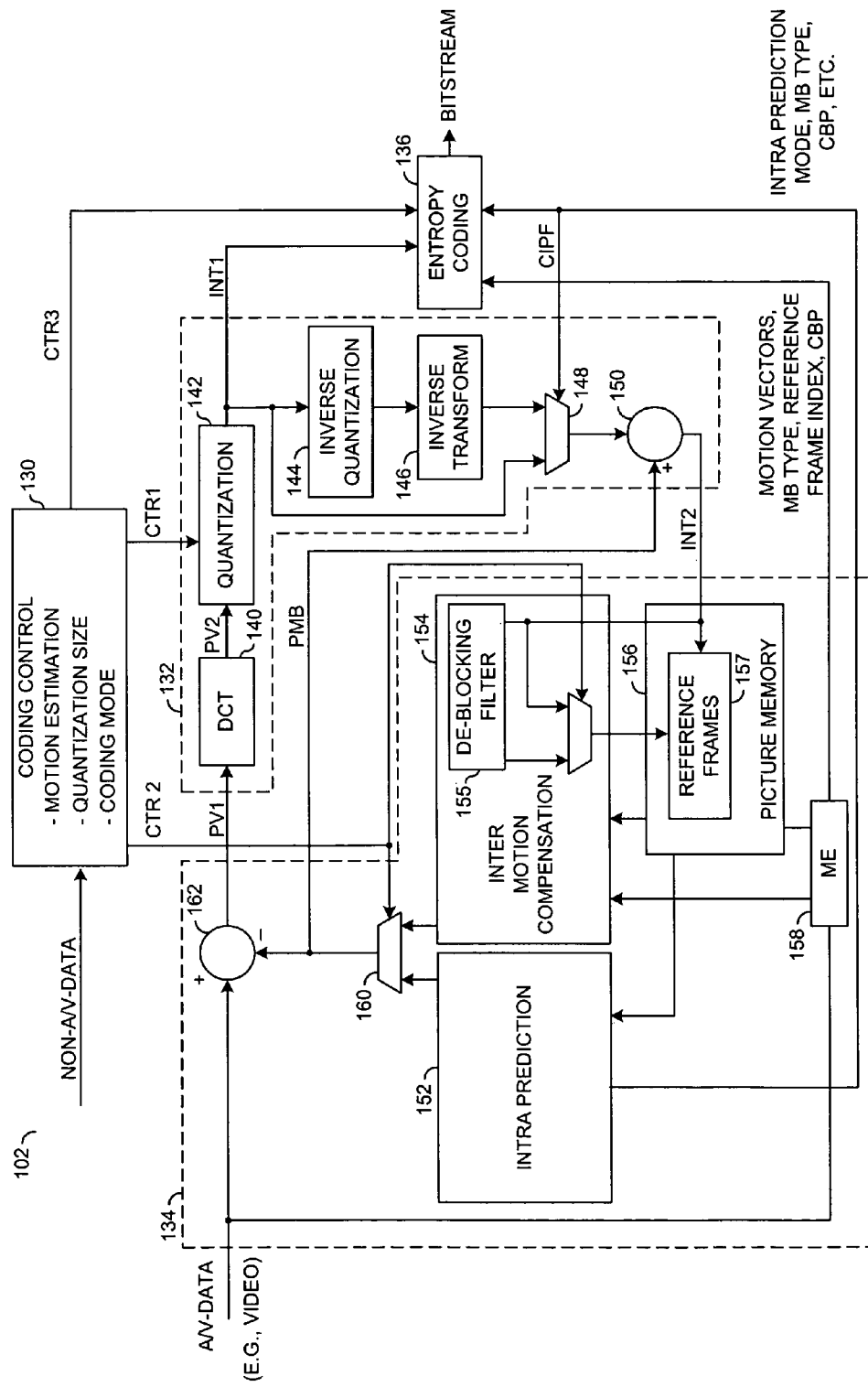
FIG. 2 is a block diagram of an encoder in accordance with a preferred embodiment of the present invention.

Referring to FIG. 2, a more detailed block diagram illustrating an example implementation of the circuit 102 of FIG. 1 is shown. In one example, the circuit 102 may be implemented as a video encoder. The circuit 102,may comprise a block (or circuit) 130, a block (or circuit) 132, a block (or circuit) 134 and a block (or circuit) 136. The block 130 may be implemented, in one example, as a coding control block. The block 132 may be implemented, in one example, as an encoder/decoder (or compression/decompression) block. The block 134 may be implemented, in one example, as a intra prediction and motion compensation block. The block 136 may be implemented, in one example, as an entropy encoding block.

The block 130 may have an input that may receive the signal NON_A/V_DATA and a number of outputs that may present a number of control signals (e.g., CTR1, CTR2, CTR3, etc.). The number of control signals CTR1, CTR2, CTR3, etc. may be configured to control one or more parameters and/or decisions of the circuit 102 (e.g., quantization size, motion vector selection, coding mode, etc.). The signals CTR1, CTR2, and CTR3 may be implemented as one or more control signals.

The block 132 may have a first input that may receive the signal CTR1, a second input that may receive a signal (e.g., PV1), a third input that may receive a signal (e.g., PMB), a fourth input that may receive a signal (e.g., CIPF), a first output that may present a signal (e.g., INT1) and a second output that may present a signal (e.g., INT2). The signal INT1 may comprise a compressed data stream. The signal PMB may comprise predicted macroblocks. The signal CIPF may comprise a constrained intra prediction flag. The signal INT2 may comprise reconstructed macroblocks.

The block 132 may comprise a block (or circuit) 140, a block (or circuit) 142, a block (or circuit) 144, a block (or circuit) 146, a block (or circuit) 148, a block (or circuit) 150. The block 140 may be implemented, in one example, as a discrete cosine transform (DCT) circuit. The block 142 may be implemented, in one example, as a quantization circuit. The block 144 may be implemented, in one example, as an inverse quantization circuit. The inverse quantization circuit 144 may be used to reverse the quantization process previously performed on the data set (e.g., the signal PV2) by the circuit 142. The inverse quantization circuit 144 generally builds a matrix of values used by the block 146. The block 146 may be implemented, in one example, as an inverse transform circuit. The inverse transform circuit 146 generally reverses the DCT process performed by the block 140, transforming the data set to the spatial domain. The inverse transform circuit 146 may also be referred to as an inverse DCT block or an IDCT block.

The block 148 may be implemented, in one example, as a multiplexer (e.g., a 2-1 multiplexer). The block 148 may be configured to select between (i) a first path that includes the inverse quantization block 144 and the inverse transform block 146 or (ii) a second mode that bypasses the block 144 and the block 146. The block 150 may be implemented as a summing block. The block 150 may generate a sum by adding the output of the block 148 with the predictor macroblock PMB received from the block 134. The sum may be presented via the signal INT2 to an input of the block 134.

The block 134 may comprise a block (or circuit) 152, a block (or circuit) 154, a block (or circuit) 156, a block (or circuit) 158, a block (or circuit ) 160, a block (or circuit ) 162 and a block (or circuit) 164. The circuit 152 may be implemented as an intra prediction circuit block. The circuit 154 may be implemented as an inter motion compensation block. The circuit 154 may include a de-blocking filter 155. The circuit 154 may be configured to present an output of the de-blocking filter 155 or bypass the de-blocking filter 155.

The circuit 156 may be implemented as a picture memory block. The circuit 156 may include a block (or circuit) 157 that may be configured to store one or more reference frames. The circuit 158 may be implemented as a motion estimation (ME) circuit. The circuit 160 may be implemented as a multiplexer (e.g., a 2-1 multiplexer). The circuit 162 may be implemented as a difference circuit. The circuit 162 generally subtracts the predictor macroblock PMB from the input signal A/V_DATA to generate the signal PV1.

The circuit 134 may have an output that may present an intermediate signal (e.g., INT3) and an output that may present an intermediate signal (e.g., INT4). The intermediate signal INT3 may contain one or more control signals. The control signals may include motion vectors, macroblock type, reference frame index, coded block pattern (CBP) information, etc. The intermediate signal INT4 may contain one or more control signals. The control signals may include, for example, intra prediction mode information, macroblock type, CBP, etc. In one example, the signal INT4 may comprise the constrained intra prediction flag CIPF. The flag CIPF may be used to determine when certain stages of the system 100 may be bypassed.

Figure 3:
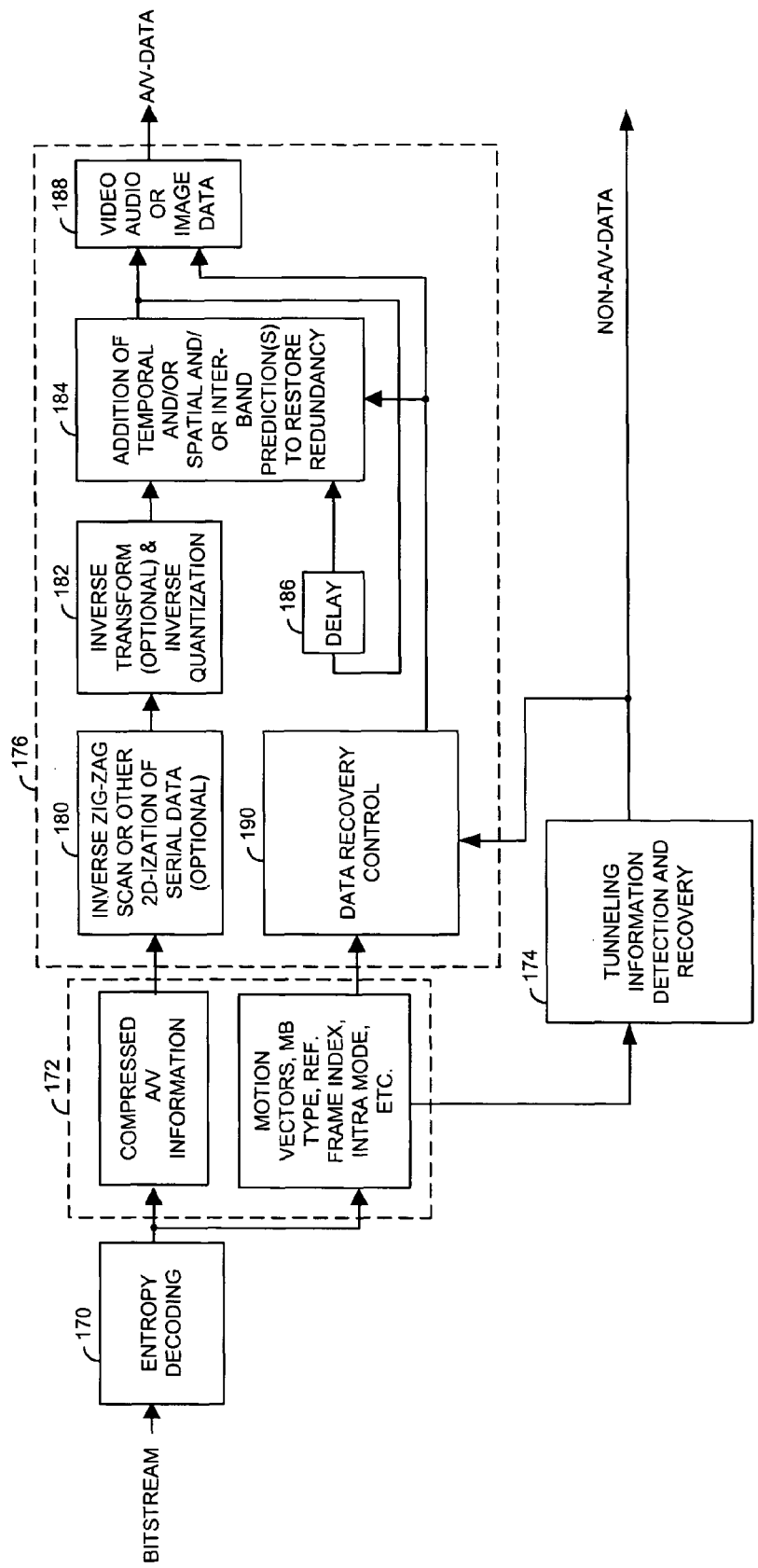
FIG. 3 is a block diagram of a decoder in accordance with a preferred embodiment of the present invention.

Referring to FIG. 3, a more detailed block diagram illustrating an example implementation of the circuit 106 of FIG. 1 is shown. The circuit 106 is generally configured to determine whether the signal BITSTREAM has been generated (i) by an encoder implemented in accordance with the present invention (e.g., contains embedded information) or by a conventional encoder. For example, the circuit 106 may be configured to analyze contents of the signal BITSTREAM (e.g., zero stuffing, mode decisions, motion vectors, quantization values, header fields, etc.) to determine whether or not tunneled information is present in the signal BITSTREAM.

The decoder 106 may be configured, for example, to decode video, audio, and/or image data. The decoder 106 may be compliant with one or more encoding standards (e.g., MPEG-1, MPEG-2, MPEG-4, VC-9, H.264, etc.). In one embodiment, the decoder 106 may comprise a block (or circuit) 170, a block (or circuit) 172, a block (or circuit) 174 and a block (or circuit) 176. The block 170 may perform entropy decoding on the compressed bitstream BITSTREAM received from the transmission and/or storage medium 104. The block 170 may present an output to the block 172. The block 172 may be configured, in one example, to parse (separate) the coefficient residuals and reconstruction (or decompression) information (e.g., motion vectors, quantization values, MB type parameters, reference frame indices, mode indicators, etc.). The block 172 generally presents the recovered transform coefficient residuals to the block 174 and the reconstruction information to the blocks 174 and 176.

The block,174 is generally configured to detect whether information is tunneled (or embedded) in the encoding choices made for the signal BITSTREAM. When the presence of embedded information (e.g., non-A/V information related to the recovered transform coefficients) is detected, the block 174 generally recovers the embedded information. The block 174 may have an output that may present the recovered embedded information (e.g., as the signal NON_A/V_DATA).

The block 176 generally reconstructs the video, audio, and/or image data from the transform coefficient residuals, the reconstruction information and the recovered embedded information. The block 176 generally comprises a block (or circuit) 180, a block (or circuit) 182, a block (or circuit) 184, a block (or circuit) 186, a block (or circuit) 188 and a block (or circuit) 190). The block 180 may receive the transform coefficient residuals from the block 172. The block 180 generally performs an inverse zig-zag scan or other deserialization (e.g., two dimensional characterization of serial data). The block 180 may be an optional block that may not be implemented in every application. The block 182 generally performs inverse transformation (e.g., inverse 4×4 integer transform, inverse discrete cosine transform (IDCT), etc.) and inverse quantization operations. The block 182 may be an optional block that may not be implemented in every application. The block 184 generally performs addition of temporal and/or spatial and/or inter-band prediction(s) (e.g., motion compensation, inter prediction, intra prediction, etc.) to restore redundancy.

The block 186 generally presents a delay from an output of the block 184 to a second input to the block 184. The delay provided by the block 186 generally provides temporal information upon which reconstruction may be based. The block 186 may be configured, in one example, to store one or more previously decoded frames. The stored frames may be used as prediction data for future (e.g., subsequent) frames. The block 184 generally reconstructs the video, audio and/or image data in response to the coefficients and motion vectors reconstructed from the compressed bitstream. The block 188 generally presents the video, audio and/or image data. The block 188 may be configured to present the signal A/V_DATA. The block 190 generally controls the operation of the block 176 based upon the information received from the blocks 172 and 174.

Figure 4:
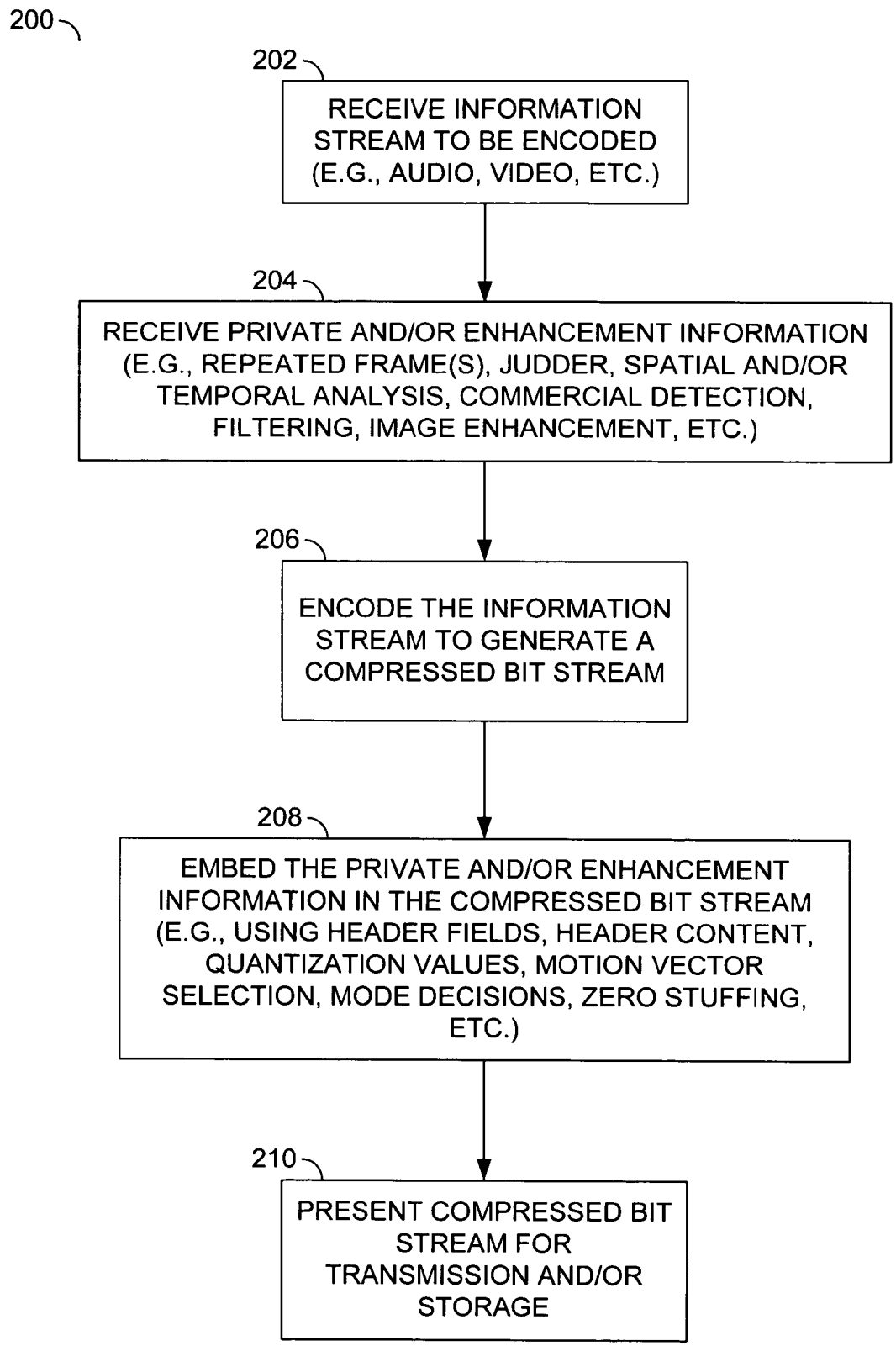
FIG. 4 is a flow diagram illustrating an encoding process in accordance with the present invention.

Referring to FIG. 4, a flow diagram 200 is shown illustrating an encoding process in accordance with a preferred embodiment of the present invention. In a first step, an encoder may receive an information stream to be encoded. The information stream may comprise audio, video, audio and video or other type of information (e.g., the block 202). The encoder may also receive private and/or enhancement information either from an external source, or, in one example, generated internally during the encode process (e.g., the block 204). The private and/or enhancement information may comprise information regarding repeated frames, judder, spacial and/or temporal analysis, commercial detection, filtering, image enhancement and/or other types of information which may be used by an aware decoder. The information stream is generally encoded by the encoder to generate a compressed bit stream (e.g., the block 206). During the encoding process for generating the compressed bit stream, the private and/or enhancement information is generally embedded (or tunneled) in the compressed bit stream using, for example, header fields, header content, quantization values, motion vector selection, mode decisions, zero stuffing and other appropriate bit stream syntax elements (e.g., the block 208). The compressed bit stream is generally presented for transmission and/or storage (e.g., the block 210).

Figure 5:
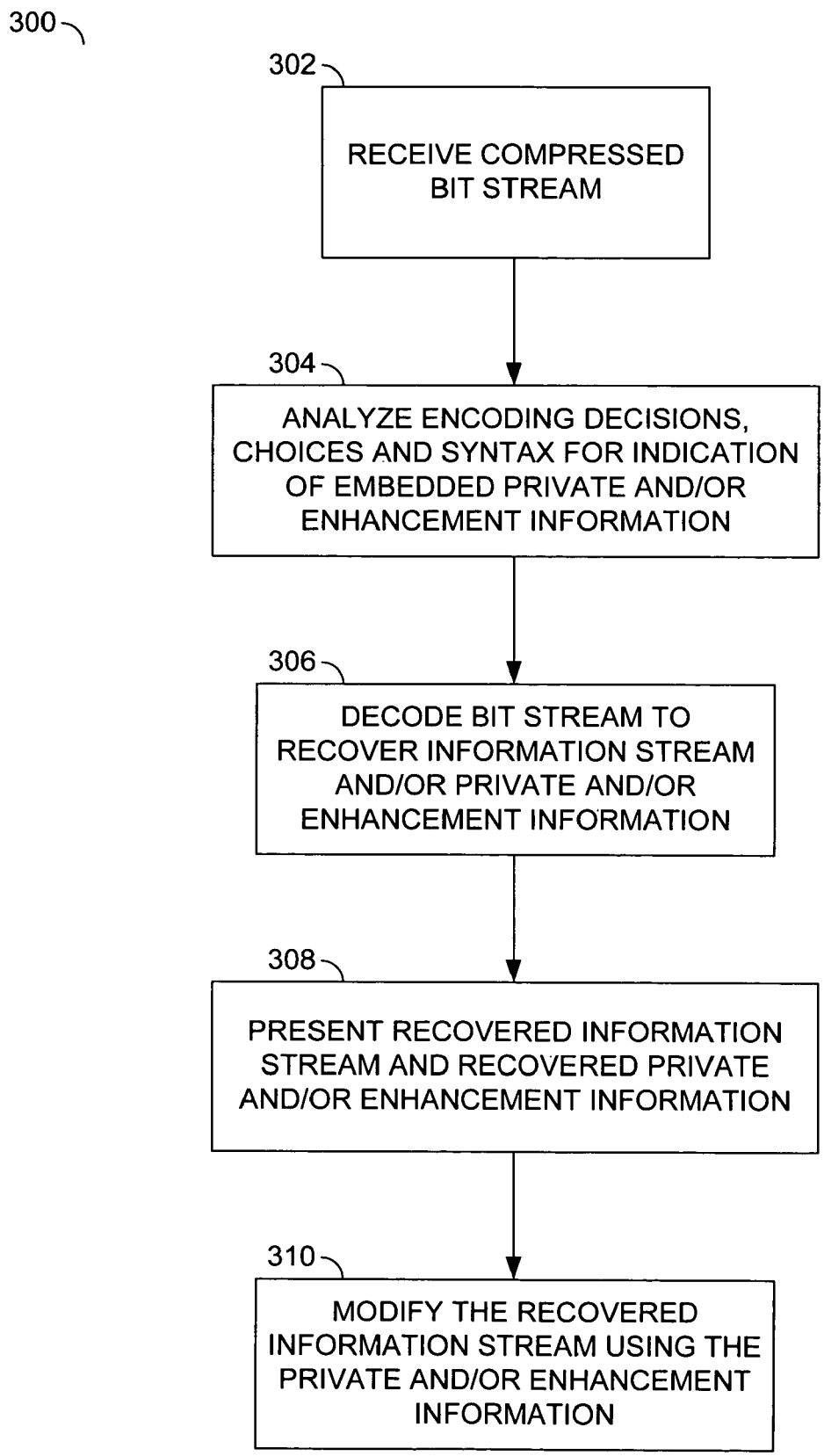
FIG. 5 is a flow diagram illustrating a decoding process in accordance with the present invention.

Referring to FIG. 5, a flow diagram 300 is shown illustrating a decoding process in accordance with a preferred embodiment of the present invention. In the first step of the decoding process 300, a compressed bit stream may be received by the decoding process (e.g., the block 302). The decoding process may be configured to analyze the syntax of the compressed bit stream to detect encoding decisions, choices and/or syntax that generally indicates the presence of embedded private and/or enhancement information (e.g., the block 304). The compressed bit stream is generally decoded to recover the information stream contained therein and, if the presence of embedded private and/or enhancement information has been signaled (detected), the private and/or enhancement information is generally recovered from the compressed bit stream (e.g., the block 306). The decode process 300 generally presents the recovered information stream and the recovered private and/or enhancement information to subsequent circuitry, or processing (e.g., the block 308). In one example, the recovered private and/or enhancement information may be used to modify the recovered information stream and/or how the recovered information stream is presented, for example, to provide an enhanced viewing experience, etc. (e.g., the block 310).

The present invention generally provides a method for tunneling information in a compressed bit stream via one or more of (i) header fields, (ii) header content, (iii) quantization values, (iv) motion vector selection, (v) mode decisions and (vi) zero stuffing. In many compression formats (e.g., MPEG-1, MPEG-2, MPEG-4, H.264, VC9, etc.) headers are generally byte aligned. In one example, the present invention generally provides a method for tunneling information in a compressed bit stream via zero stuffing. For example, the encoder 102 may be configured to put additional bytes of zero's before the headers of the signal BITSTREAM. The number of zeros placed before a particular header may be used to signal the information. For example, by sending a variable number of zeros before the first slice header in a picture, any number "N" may be transmitted. However, at least N bytes are generally needed to send the number N.

In one embodiment, the number of zeros may represent the number transmitted. Such an embodiment may be useful when the presence of the extra data may be otherwise known by the decoder or when typical patterns of inserted data show a pattern of numbers sent that can be detected. In the latter case, a decoder implemented in accordance with the present invention generally looks for the pattern before determining whether data is being tunneled (transmitted) in the compressed bit stream.

In another embodiment, the number of zeros sent may be N+K, where K is a fixed number that is larger then the number of zeros that typical encoders use. When the decoder detects N+K>=K zeros, the decoder knows that data is being transmitted.

Information may be tunneled in the signal BITSTREAM by controlling mode decisions. For example, in non-intra pictures, intra macroblocks are rare. Data may be signaled, in one example, by setting specific macroblocks to intra. The decoder 106 may be configured to detect the predetermined pattern of intra macroblocks and determine that data is being sent.

In another example, the present invention may be configured to signal data via motion vector selection. For example, field motion may be implemented where the top and bottom current fields use, respectively, identical top and bottom predictors. Such an occurrence is unusual because a conventional encoder generally uses a frame vector in such a case.

In another example, the present invention may be configured to use quantization values for signaling (tunneling data). For example, the quantization value in particular macroblocks may be used to signal that tunneled data is present in the signal BITSTREAM. In another example, the quantization difference between two specific macroblocks may be used to signal the presence of data. In yet another example, the quantization value contained in a slice header may be used to convey information.

Because non-coded blocks generally do not carry a quantization value, two methods may be implemented to ensure that a quantization value may be sent. In one example, control of the quantization values and the mode decisions may be combined. For example, certain macroblock(s) may be coded intra to signal that data is present and to ensure that a quantization value may be sent. In another example, the quantization value may be put in the slice header. However, the latter generally applies to standards such as MPEG-2 that carry quantization values in the slice header.

In yet another example, header- fields of the signal BITSTREAM may be used to signal the tunneling of information. For example, extra headers (e.g., quantization matrix extension) may be used to convey information to the decoder 106. The extra headers may be overridden by subsequent headers, since only the most recent one is generally used by the decoder.

The present invention may be implemented to convey a number of types of information. For example, the present invention may be configured to convey one or more of repeated frames information, judder information, spatial analysis information, temporal analysis information, commercial detection information, de-interlacing control information, filtering information, and image enhancement information. However, other type of information may be conveyed accordingly to meet the design criteria of a particular implementation. For example, watermark instructions and/or information may be conveyed through tunneling.

Information regarding repeated frames and fields may be conveyed via tunneling information in the compressed bit stream rather than using repeat_first_field syntax. For example, in many cases, it is desirable for an encoder (e.g., a DVD recorder) to store or transmit a stream that (i) can be played back by a conventional decoder without any special processing to make the display less jerky, and (ii) can be played back by an aware decoder in a way that reduces jerkiness. Signaling repeats in a way that does not cause a non-aware decoder any problems is desirable. For example, the number of zeroes placed before a particular header may be used to signal the repeat information (e.g., no extra zeroes=not film material; one extra zero=film material but picture is not a repeat; 2 extra zeroes=film material and this picture is a repeat). In another example, the quantization value in a first macroblock of a picture may be used to signal the status. In still another example, a difference between the first two quantization values in a picture may be used to signal the status.

Judder information may be communicated to improve the reconstructed image. 24 Hz (film) data is often decompressed and displayed at 60 Hz progressive or interlaced. Similarly, 25 Hz progressive material sometimes needs to be displayed at 50 Hz progressive. While data may be displayed at the correct rate by simply repeating fields (for interlaced) or frames (for progressive) it is sometimes appropriate to displace the displayed frames to create smoother motion (e.g., on camera pans) to reduce the jerky motion (known as 'judder') in the display. Judder reduction is particularly important on large displays.

To reduce judder, the encoder 102 may be configured to compute the correct vector to use for each frame to reduce judder and transmit the vectors to the decoder 106. The decoder 106 may be configured to use the vectors for display, in a manner similar to "pan and scan". A possible alternative is for the decoder to compute the vectors from the decoded pictures. However, in many cases having the decoder compute the vectors is undesirable because computing the vectors may be quite expensive (e.g., bandwidth, space, computation) and it is often more economical for an encoder to do the computations. For example, DVDs are often authored on authoring systems costing more than $10,000 and then played back on DVD players that cost less than $100. It generally is more cost effective to add some complexity and cost to the authoring station rather than to the player. Moreover, decode-only ICs generally do not have motion estimation hardware.

The present invention may be configured to convey other content analysis information. For example, information generated by the encoder from a spatial and temporal analysis of the content may be tunneled through to an aware decoder (e.g., to enhance the playback experience). For example, information related to commercial detection, de-interlacing control, filtering, image enhancement, repeated fields (e.g., 3:2 pulldown communications), etc. may be conveyed.

In one embodiment, commercial detection information may be tunneled in the compressed bit stream. For example, a real-time DVD-recorder may signal likely commercial start and end points in information embedded in the bit stream itself. For example, the information may be conveyed in high level headers easily parsed by a demultiplexer. In one example, a user may press a 'skip' button, in which case the player scans through the data to find the commercial end point signaled in the tunneled data. A 'non-aware' player would either have to guess at the commercial duration and just jump ahead (not enough or too much, in general).

De-interlacing control information may be communicated by tunneling information from the encoder to the decoder. Low-cost stand alone and personal computer (PC) players do not have sophisticated spatial and temporal analysis algorithms and hardware (e.g., increases system cost and complexity) and tend to have poor de-interlacing as a result. Even signaling "Bob" or 'Weave" may provide a significant improvement in many cases.

Filtering and image enhancement information may be signaled. As above, the aware player may-be configured to receive suggestions as to how to apply various controls, including sharpness and contrast.

Special cases may be signaled for localized processing. In one example, a digital encoder (DENC) may receive a digital signal (e.g., in 4:2:2 YUV format) that may be processed by adjusting for brightness, sharpness, contrast, gamma, etc. and reformatted into one or more other digital signals (e.g., RGB, composite, s-video, etc.) before being sent to a D/A converter. For example, a text crawl over progressive background may be signaled and special processing may be applied to the particular region (e.g. through sharpness control in the DENC just on the respective horizontal slice or slices).

The present invention generally provides advantages over conventional systems. For example, sending private stream data or enhancement data elsewhere on disk (e.g in a separate file), in order to avoid the possibility of breaking the hundreds of millions of DVD playback devices, generally does not work. Even DVD+RW is less than 100% backward compatible with DVD-V.

The present invention generally provides a solution that is 100% backward compatible. 'Aware' players may be configured to detect the signature in the elementary stream encoding decisions and make use of the extra information to provide an improved viewing experience.

In some cases, a player without the present invention may be implemented at additional cost through the incorporation of (i) scene analysis hardware (increase chip cost), (ii) additional memory for frame storage (system cost), and/or (iii) additional delay for the spatial and temporal analysis to occur (poor system response). In other cases, the information required resides only in the encoder and cannot be regenerated in the decode portion of a system, or is non-causal (e.g. commercial begin and end detection) and cannot be re-generated.

The functions performed by the present invention may be implemented in hardware, software (firmware), a combination of hardware and software. The present invention may be implemented using a conventional general purpose digital computer programmed according to the teachings of the present specification, as will be apparent to those skilled in the relevant art(s). Appropriate software coding can readily be prepared by skilled programmers based on the teachings of the present disclosure, as will also be apparent to those skilled in the relevant art(s).

The present invention may also be implemented by the preparation of ASICs, FPGAs, or by interconnecting an appropriate network of conventional component circuits, as is described herein, modifications of which will be readily apparent to those skilled in the art(s).

The present invention thus may also include a computer product which may be a storage medium including instructions which can be used to program a computer to perform a process in accordance with the present invention. The storage medium can include, but is not limited to, any type of disk including floppy disk, optical disk, CD-ROM, magneto-optical disks, ROMs, RAMs, EPROMs, EEPROMs, Flash memory, magnetic or optical cards, or any type of media suitable for storing electronic instructions.

As used herein the term tunneling generally refers to embedding a first type of information (or data) in a bit stream carrying a second type of information such that (i) both the first and second types of information may be recovered by a receiver that is aware of the tunneling process and (ii) the second type of information may be recovered by a receiver that is unaware of the tunneling process with little or no effect from the presence of the first type of information. In one example, the first type of information may comprise private or enhancement information.

While the invention has been particularly shown and described with reference to the preferred embodiments thereof, it will be understood by those skilled in the art that various changes in form and details may be made without departing from the spirit and scope of the invention.

The invention claimed is:

1. A method for conveying private information or enhancement information in a compressed bit stream comprising the steps of:
   generating a single compressed bit stream by encoding a first data stream, wherein encoding said first data stream comprises making a plurality of encoding choices; and
   controlling the encoding choices made based upon a second data stream comprising one or both of said private information and said enhancement information.

2. The method according to claim 1, further comprising the step of:
   receiving said compressed bit stream;
   determining the encoding choices made in generating said compressed bit stream; and
   recovering said second data stream from said compressed bit stream based upon the encoding choices made.

3. The method according to claim 1, wherein said encoding choices are controlled such that recovery of said first data stream from said compressed bit stream by legacy decoders is unaffected.

4. The method according to claim 1, wherein said second data stream comprises one or more of judder information, repeated frames information, spatial analysis information, temporal analysis information, commercial detection information, de-interlacing control information, filtering information, and image enhancement information.

5. The method according to claim 1, wherein said encoding choices comprise one or more of (i) header fields, (ii) header content, (iii) quantization values, (iv) motion vector selection and (v) mode decisions.

6. The method according to claim 1, wherein:
   said first data stream comprises audio-video (A/V) information; and
   said second data stream comprises non-A/V information related to said first data stream.

7. The method according to claim 1, wherein said second data stream comprises data generated in response to one or both of a spatial analysis and a temporal analysis of said first data stream.

8. A method for recovering private information or enhancement information in a compressed bit stream comprising the steps of:
   receiving a single compressed bit stream;
   determining encoding choices made during generation of said compressed bit stream;
   analyzing the encoding choices and syntax of said compressed bit stream for an indication of embedded private or enhancement information; and
   decoding said compressed bit stream to recover said private or enhancement information and a data stream.

9. The method according to claim 8, further comprising the step of:
   modifying a presentation of said data stream using said private or enhancement information.

10. An apparatus comprising;
    means for generating a single compressed bit stream by encoding a first data stream, wherein encoding said first data stream comprises making a plurality of encoding choices; and
    means for controlling the encoding choices made based upon a second data stream comprising one or both of private information and enhancement information.

11. The apparatus according to claim 10, further comprising:
   means for receiving said compressed bit stream;
   means for determining the encoding choices made in generating said compressed bit stream; and
   means for recovering said second data stream from said compressed bit stream based upon the encoding choices made.

12. An apparatus comprising:
   a first circuit configured to generate a single compressed bit stream by encoding a first data stream, wherein encoding said first data stream comprises making a plurality of encoding choices; and
   a second circuit configured to control the encoding choices made based upon a second data stream comprising one or both of private information and enhancement information.

13. The apparatus according to claim 12, further comprising:
   a third circuit configured to (i) receive said compressed bit stream, (ii) determine the encoding choices made in generating said compressed bit stream and (iii) recover said first data stream and said second data stream from said compressed bit stream based upon the encoding choices made.

14. The apparatus according to claim 12, wherein said first circuit is further configured to control said encoding choices such that recovery of said first data stream from said compressed bit stream by legacy decoders is unaffected.

15. The apparatus according to claim 12, wherein said second data stream comprises one or more of judder information, repeated frames information, spatial analysis information, temporal analysis information, commercial detection information, de-interlacing control information, filtering information, and image enhancement information.

16. The apparatus according to claim 12, wherein said encoding choices comprise one or more of (i) header fields, (ii) header content, (iii) quantization values, (iv) motion vector selection and (v) mode decisions.

17. The apparatus according to claim 12, wherein:
   said first data stream comprises audio-video (A/V) information; and
   said second data stream comprises non-A/V information related to said first data stream.

18. The apparatus according to claim 12, wherein said second data stream comprises data generated in response to one or more of a spatial analysis and a temporal analysis of said first data stream.

19. An apparatus comprising:
   a first circuit configured to (i) receive a single compressed bit stream and (ii) recover a first data stream comprising private or enhancement information based upon determination of a plurality of encoding choices made in generating said single compressed bit stream from a second data stream; and
   a second circuit configured to recover said, second data stream in response to said compressed bit stream and modify a presentation of said second data stream based upon said first data stream.

20. The apparatus according to claim 19, wherein:
   said first data stream comprises non-audio-video (A/V) information related to said second data stream; and
   said second data stream comprises A/V information.

21. The apparatus according to claim 19, wherein said first data stream comprises one or more of judder information, repeated frames information, spatial analysis information, temporal analysis information, commercial detection information, de-interlacing control information, filtering information, and image enhancement information.

22. The apparatus according to claim 19, wherein said encoding choices comprise one or more of (i) header fields, (ii) header content, (iii) quantization values, (iv) motion vectors and (v) mode decisions.

* * * * *